United States Patent [19]

Wistozky et al.

[11] 3,709,752

[45] Jan. 9, 1973

[54] METHOD OF MAKING SUEDE-LIKE PLASTIC

[75] Inventors: Reuben Wistozky; Richard E. Petersen, both of Lowell, Mass.

[73] Assignee: Pandel-Bradford, Inc., Lowell, Mass.

[22] Filed: Jan. 20, 1971

[21] Appl. No.: 108,193

Related U.S. Application Data

[63] Continuation of Ser. No. 661,459, Aug. 17, 1967, abandoned.

[52] U.S. Cl. ............... 156/79, 156/242, 156/247, 156/250, 156/344, 161/67, 161/89, 161/159, 161/160, 161/164
[51] Int. Cl. .................... B32b 5/18, B32b 31/00
[58] Field of Search ..................... 225/1-5, 6; 156/79, 247, 250, 254, 242, 344, 584; 161/62-67, 159-161, 88, 89, 164

[56] References Cited

UNITED STATES PATENTS

| 3,123,508 | 3/1964 | Waugh | 156/78 |
| 3,041,193 | 6/1962 | Hamway et al. | 117/11 |

FOREIGN PATENTS OR APPLICATIONS

| 3,479 | 6/1962 | Japan | 161/159 |
| 7,229 | 5/1963 | Japan | 161/159 |

*Primary Examiner*—William A. Powell
*Attorney*—Martin Kirkpatrick

[57] ABSTRACT

A suede-like plastic material is prepared from a fabric coated with a cellular vinyl chloride resin. The surface of the resin material is characterized by an undulating or irregular surface which is generally uniformly composed of tensile ruptured cells giving the surface a suede-like appearance approaching that of natural suede leather. The suede material is prepared by the bonding together of surfaces of two resin layers of differing relative tensiles, at least one layer being gelled blowable vinyl chloride resin, which are subsequently heated to form a cellular laminate. The laminate is then delaminated by stripping the layers apart along the bonding plane between the surface, the stripping occurring by the tensile discontinuity of the original bonding or lamination process thereby imparting a natural suede-like material to at least one delaminated surface of the resin layers.

The suede-like surface can also be prepared by forming a temperature gradient across a section of the foam and rupturing the cells.

30 Claims, 4 Drawing Figures

INVENTORS.
REUBEN WISOTZKY
RICHARD E. PETERSEN
BY
ATTORNEYS

METHOD OF MAKING SUEDE-LIKE PLASTIC

This application is a continuation of application Ser. No. 661,459, filed Aug. 17, 1967, now abandoned.

BACKGROUND OF THE INVENTION

Normally the surface of plastic sheeting such as vinyl chloride resin sheet is smooth and often shiny in appearance. It is often desirable to prepare plastic surfaces which have a different appearance, feel or texture such as for uses as a decorative covering or for utilitarian purposes. It is particularly desirable to prepare a soft flexible plastic coated fabric which has the feel and appearance of more expensive suede-like material such as leather. In the past attempts to obtain such a plastic suede-like material and a suede-like surface have not been wholly successful. Some methods have been directed toward separate or additional treatments of the surface of the plastic material to obtain the desired appearance. Such additional treatment has often resulted in a product of less than acceptable appearance, while additional treatment has resulted in a more expensive operation than commercially acceptable. For example, U.S. Pat. No. 3,041,193 issued June 26, 1967, to e.g., Hamway et al, describes a method of making a suede-like plastic sheeting material by preparing a cellular polyvinyl coating on a fabric and then abrading the exposed surface of the cellular layer to produce a suede-like finish. The patent is hereby incorporated by reference in its entirety in this application. Another technique which also requires an abrasion operation is set forth in U.S. Pat. No. 3,312,586 issued Apr. 4, 1967, to T.W. Barlow.

SUMMARY OF THE INVENTION

Our invention relates to a suede-like plastic material composed of a sheet material having a cellular plastic coating thereon, the surface of the coating characterized by an undulating or irregular surface which is generally uniformly composed of ruptured open cells with short fiber-like resin surface which presents a suede appearance to the surface and which material is flexible and has a soft hand. The exposed cell edges are rough and irregular and therefore provides the fiber-like characteristic similar to leather.

Our material is prepared by bonding together the resin surfaces of a first and a second resin coated sheet material, at least one layer, thereof, containing a blowing agent and, thereafter heating the bonded laminate to decompose the blowing agent to create one or two cellular layers in the laminate. The laminate is then delaminated by stripping apart the bonded surfaces of the first and second sheet materials to provide the finished product which is a sheet material having a cellular layer thereon with a suede-like surface. In general the stripping operation occurs across the entire planar surface of the cellular layer wherein a tensile gradient or a plane of tensile discontinuity occurs between the surface of the first and second sheet material. This controlled delamination provides for the controlled rupture of the cells of the one or both cellular layers to impart an irregular or undulating natural suede-like surface to the product. The tensile gradient or discontinuity between the bonded surface may be created by a number of various methods including for example, degree of expansion, variation in the resin formulation and composition of the resin layers such as the variation of silica content, the type and molecular weight of the resin, and the amount and type of plasticizer employed. Other methods include without limitation the use of physical methods such as employing a temperature gradient across the laminate layers and the temperatures at which the lamination and/or delamination occurs. Alternately, an adhesive-coated substrate is applied to a cellular layer. The adhesive chosen is one with sufficient internal strengthth to remove the top of the cellular layer upon delamination thereby providing the open-celled suede-like structure.

Various types of suede-like and other rough finishes may be imparted to one or more of the surfaces of the cellular sheet material by varying the tensile or fiber-forming properties of the resin or the temperature at which the delamination occurs. For example, our stripping operation permits a more natural undulating surface effect to be obtained since the stripping operation unlike a synthetic cutting operation or an abrasion operation provides a random irregular surface which may vary in thickness from a plane surface for example, from 1 to 5 mils. This is to be contrasted with an abrasion operation for example, wherein the abrading wire wheel gives a generally level regular surface across the entire fabric and destroys and reduces a portion of the surface in the operation. In our method, both surfaces which have been split open by tensile rupture have the desirable suede-like surface. Further by varying the temperature at which controlled delamination occurs, the amount of short fibers present and surface appearance of our material may be varied. Where a lower temperature of delamination is employed there is a tendency for the resin surfaces to form more a fibrous surface, that is the resin tends to stretch more before breaking apart from the plane of tensile discontinuity or the bonding plane between the first and second sheet materials. At higher temperatures, there is usually less tendency for the resin fibers to be pulled out in length, since the thermoplastic fibers tend to break quickly and, therefore, form short fiber lengths on the surface thereby giving a different appearance to the sheet material surface. Of course, the selection of the particular temperature or temperature range to use in the stripping operation depends upon the type surface desired and character of the resin and formulation employed.

One preferred method of preparing the material is to employ a first and second sheet material both of which contain a blowable plastic layer thereon and both of different thicknesses, so that upon the subsequent formation of the cellular layers and the controlled delamination, both portions of the laminate, that is, the first and second sheet materials, both have surfaces of a suede-like appearance.

The term "tensile ruptured," as used therein is intended to refer to the cleavage of the cells and the weakest structural point to form a ragged-edged, irregularly-shaped, open cells providing a random irregular surface.

It is, therefore, an object of our invention to provide a new and unique cellular plastic sheet material which is soft and flexible and has a surface appearance of a natural suede-like finish.

Another object of our invention is to provide a method or preparing a suede-like plastic sheet material and particularly a cellular vinyl chloride resin coated fabric material having a suede-like surface by both a plastisol and calendering technique.

DESCRIPTION OF THE PREFERRED EMBODIMENTS

Figure 1:
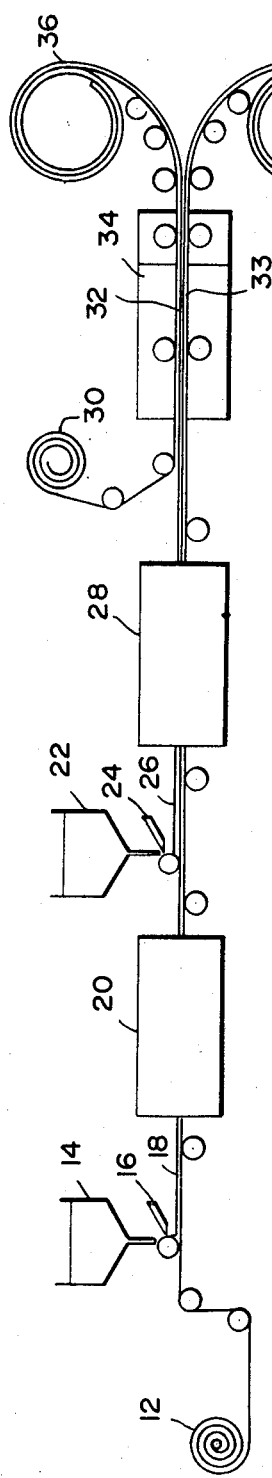
FIG. 1 is a schematic illustration of one method of preparing a resin coated fabric in accordance with our invention which fabric has a suede-like cellular surface.
Figure 3:
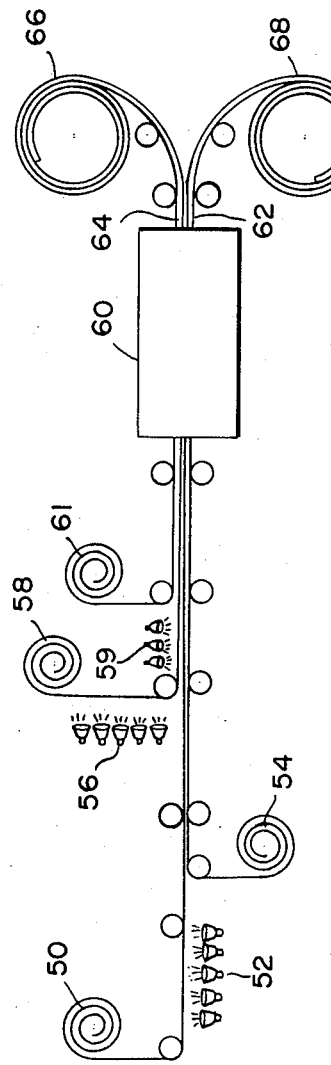
FIG. 3 is a schematic illustration of another method of preparing suede-like materials of our invention by the use of calendered resin sheets.

A cellular vinyl chloride resin coated fabric having a suede-like cellular surface may be prepared by the use of resin formulations such as those set forth in Tables 1 and 2, hereafter, by the process shown in FIG. 1, while a process employing calendered sheets of vinyl chloride resin is shown more particularly in FIG. 3. In the method as shown in FIG. 1, a backing sheet of a thin inexpensive casting type paper 12 has a plastisol cast onto the surface at a thickness of approximately two to ten mils for example, three to six mils. The vinyl chloride resin plastisol from a source 14 is cast or coated onto the surface by the use of doctor blade 16 or other coating technique. The typical plastisol formulation is set forth in Table 1 and is composed primarily of a low or medium molecular weight resin with an excess of plasticizer that is it is compounded to exhibit low hot film strength. The backing sheet 12 with the thin plastisol coating 18 is then passed through an oven 20 and heated to a temperature sufficient to gel and/or blow the vinyl chloride resin; typically, a temperature of 255°–350° F., e.g. 300° F. The time in the oven is adjusted to provide a substantially tack-free coating surface to the gelled layer 18. After removal from oven 20, another vinyl chloride resin plastisol formulation such as that set forth in Table II, is cast coated from a source 22 by a doctor blade 24 to form a relatively thick layer 26 on the surface of the gelled vinyl chloride layer 18. The plastisol layer 26 is cast in a thickness of from about 5 to 50 mils, preferably 10 to 30 mils, and has been compounded employing a high molecular weight polymer with lower plasticizer levels so as to provide a higher film hot strength than layer 18. This formulation is selected to provide the coated layer having the more natural suede-like appearance.

TABLE I

| INGREDIENTS | Parts By Weight |
| --- | --- |
| Low molecular weight polyvinyl chloride resin (EXON 605 )[1] | 50 |
| Diluent resin (PLIOVIC M-70)[2] | 50 |
| Filler (calcium carbonate) | 15 |
| Plasticizer | |
| a) Monomeric (nonyl octyl decyl adipate | 12.0 |
| (diisooctyl phthalate | 44.0 |
| b) Polymeric (SANTICIZER 845)[3] (containing isooctyl expoxy tallate) | 4.0 |
| Blowing agent (Kempore 200)[4] azodicarbonamide | 1.75 |
| Stabilizer (Actofoam–R–3)[5] mixture of zinc and potassium fatty acid salts in dioctylphthalate | 0.75 |
| TOTAL | 177.50 |

1. A trademark of Firestone
2. A trademark of Goodyear
3. A trademark of Monsanto
4. and 5. A trademark of National Polychemicals, Inc.

TABLE II

| INGREDIENTS | Parts By Weight |
| --- | --- |
| Vinylchloride resin - dispersion grade (GEON 121)[1] | 37.0 |
| (GEON 222)[2] | 17.0 |
| (PLIOVIC WO)[3] | 9.0 |
| Diluent resin (PLIOVIC M–70)[4] | 35.0 |
| Plasticizer | |
| a) monomeric (nonyl octyl phthalate | 12.0 |
| (Butyl dioctyl phthalate | 10.0 |
| (diisoocyl phthalate | 29.0 |
| b) polymeric (SANTICIZER 845)[5] | 3.0 |
| blowing agent (KEMPORE 200)[6] azodicarbonamide | |
| Stabilizer – activator (ACTOFOAM R–3)[7] | 2.0 |
| TOTAL | 154.0 |

1. and 2. A trademark of Goodrich
3. A trademark of Goodyear
4. A trademark of Goodyear
5. A trademark of Monsanto
6. and 7. A trademark of National Polychemicals, Inc.

Backing sheet 12 with gel layer 18 and plastisol layer 26 is then passed to a hot air oven 28 wherein the layer 26 is heated to a temperature, as in oven 20, that is sufficient to gel the plastisol or decompose the blowing agent therein. The temperature of oven 28 is typically from 300° to 400° F. Of course, the desired vinyl chloride resin layer 26 may be the same or a different color than layer 18 to provide any desired contrast. The same resins or plasticizers may also be employed in both layers provided that the amounts or other compounds are employed to provide formulations with different properties. Where similar formulations are used then a temperature gradient may be used to provide strippable layers.

The gelling time in oven 28 should not be sufficient to provide a tack-free coating in the surface of layer 26. Layer 18 is normally gelled to a tack-free surface coating so that there is a reduction of migration of the layer 26 into layer 18 which may blur the plane of tensile discontinuity and the controlled delamination which is later desired. However, the top surface of layer 28 should be slightly tacky after emerging from oven 26. A backing fabric 30 such as a woven cotton or non-woven material is then placed on the top surface of the tacky layer 26 and pressed into adhering contact with the surface. If the top surface of layer 26 is essentially tack-free, the fabric 30 may not adhere to the surface, while if layer 28 has been insufficiently gelled, a porous cotton fabric might wick up a portion of the plastisol or plasticizer and become discolored.

The laminate comprising backing sheet 12, gel layer 18, gel layer 26, and backing fabric 30 is then heated in oven 34 to a temperature sufficient to decompose the blowing agent in layers 18 and 26 to create several blown or cellular layers 32 and 33 which layers are bonded together by surface of tensile discontinuity 35. Typically, the laminate should be heated to a temperature of from about 375° to 435° F until substantially all of the blowing agents has decomposed.

The cellular laminate, after removal from oven 34 is then delaminated by stripping the backing fabric 30 with cellular layer 32 from cellular layer 33 and the backing sheet 12. The stripping operation may be accomplished by a rapid or gradual pulling apart of the respective coated sheet materials. In the process described, the stripping is carried out just after emersion of the laminate from oven 34 so that the temperature of stripping is approximately 275° F to 350° F. Of course, if desired, the laminate may be stored as the gelled laminate or blown laminate and the stripping operation carried out as required. As the backing fabric 30 is pulled in one direction and the backing sheet 12 is another, the laminate will delaminate along the general planar surface of contact between layer 33 and 32 where there is tensile gradient or tensile discontinuity between the resin layers created by the formulations used. The higher hot resin strength of the layer 26 will create a natural suede-like open rupture cell surface on the cellular layer 32 while surface of cellular layer 33 may be more grainy in nature.

Figure 2:
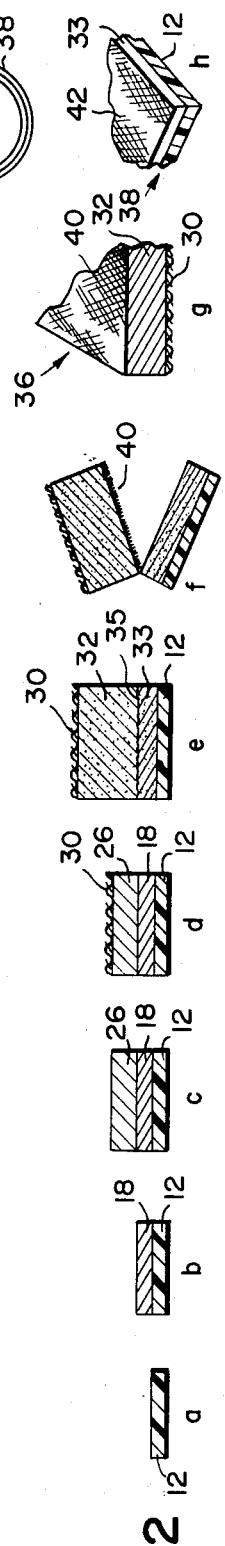
FIG. 2a–h illustrates cross-section views of enlarged fragmentary materials at various steps of the process as shown in FIG. 1.

FIG. 2 shows representative cross-sectional views of the backing sheet layer 12, layer 18 and 26, backing fabric 30, cellular layers 32 and 33 as the material is processed through the corresponding steps of FIG. 1. FIGS. 2g and h illustrate the irregular surfaces 40 and 42 as prepared by the controlled stripping which surface 40 represents a suede-like appearance.

Our invention has been described in particular employing a backing fabric and a backing sheet, however, it is recognized that the backing sheet and backing fabric may be the same or different materials. For example, woven and non-woven natural and synthetic sheet materials may be employed as desired, such as woven sheet materials like cotton, wool and silk, hemp, felt, or knitted materials or fabrics which are extensible and stretchable in one or more directions. Fibrous materials would include glass fibers, kraft paper, rayon, nylon, polyethylene, polypropylene, urethanes, acrylics or other synthetic fibrous material such as polyesters or combinations thereof. In particular our invention has been illustrated by employing smooth sheet material, however, it is also recognized that the backing sheet and/or fabric may be embossed, for example, having a decorative design thereon, to impart a decorative suede-like surface appearance. Further, the sheet material may have one or more other coatings thereon such as primer or bonding or decorative coatings. In the process described, the cellular-coated backing sheet 38 which has only a thin cellular layer thereon may then be reused several times as the backing sheet 12 in the process or if desired, it may be employed for covering or decorative or other purposes where a suede-like or roughened finish is desirable.

FIG. 3 is a schematic illustration of a process employing calendered vinyl chloride resin sheet material. For example, the calender sheet material employed in this embodiment of our invention may be that described in the U.S. Pat. No. 2,964,799 issued Dec. 20, 1960 to P.E. Roggi et al which patent is hereby incorporated by reference in its entirety in this application. As shown, a thin calendered polyvinyl chloride sheet 50 containing a blowing agent ( for example a calendered sheet prepared as in Table I ) is unrolled and one surface heated, such as by infrared heaters 52, to a soft condition, but insufficiently to decompose the blowing agent therein. The tacky surface is then placed in contact with the surface of the backing sheet 54 to adhere thereto after passing through a pair of contacting rollers. Another polyvinyl chloride calendered sheet material 58 formulated as in Table 2 also have its one surface heated to a tacky condition by infrared heaters 56 which surface is then pressed against the opposite surface through calender rolls to calender sheet 50. Of course if desired, the top surface of sheet 50 could be treated or both surfaces heated prior to bonding of sheets 50 and 58.

Also, 58 may be a calendered laminate comprising a backing fabric having a calendered sheet secured thereto of a vinyl chloride resin containing a blowing agent or as illustrated a separate backing fabric 61 may be passed into contact with the top surface of the calendered vinyl chloride resin 58 after rendering the surface tacky through heaters 59. The bonded laminate of backing fabric 61, calendered sheet 58, calendered sheet 50 and backing fabric 54 is then passed to an oven 60 wherein the laminate is heated to a temperature of about 400° to 425° F. to decompose the blowing agents in both calendered sheets layers to create blown or cellular layers 62 and 64. Upon emergence from the oven at a temperature of about 340°–360° F backing fabric 61 with layer 64 stripped away across substantially the surface plane of contact from backing fabric 54 and cellular layer 62 to provide two separate cellular coated fabrics each having a suede-like cellular surface finish.

Figure 4:
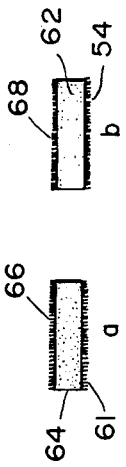
FIG. 4a and b, is a representative cross-section view of an enlarged fragmentary material as prepared by the method set forth in FIG. 3.

FIG. 4 is a cross-sectional representation of the new suede-like material prepared by the calender method as set forth in FIG. 3 wherein the suede-like surface 66 and 68 are similar in nature. In this illustration the calendered sheets are approximately equal in thickness, but as before of different resin strength so that at the stripping temperature used, there is created a tensile gradient across the surface of bonding thereby permitting the controlled stripping. However, in this case two separate products are obtained, one having a mirror image suede-like finish relative to the other.

In general, the ratio of thickness of the layer may vary from 1:10 to 10:1 preferably 5:1 to 1:5. Our invention has been illustrated with particular resin formulations, however, as set forth in both Hemway et al and Roggi et al patents, various resins as well as monomeric and polymeric plasticizers blowing agents, fillers and other materials may be employed in such resin formulations. In particular, our invention has been described wherein both the backing sheet and the fabric sheet have employed blowable vinyl chloride resin layers. However, it is also recognized that the backing sheet need not have a blowable vinyl chloride resin layer, but that a vinyl chloride resin with or without a blowing agent or another resin coating may be employed on the backing sheet to provide the control stripping and delamination from the cellular vinyl chloride resin layer making up the suede-like product. The selection of the resin formulation to employ on the backing sheet requires that the resin form a bond with the blowable resin formulation from which it is to be later stripped, yet the bond must be such as to be easily stripable therefrom after blowing of the blowable layer essentially along the plane of bonding. Various thermoplastic or thermosetting resins may accordingly then be used on the backing sheet with or without the blow-

What is claimed is:

1. A method of preparing a sheet material having a suede-like surface appearance, which method comprises:
   a. laminating together the thermoplastic resin surfaces of a first and second laminate to form a sandwich laminate each laminate comprising a sheet material having a thermoplastic resin layer bonded thereto, the layer of the first laminate containing a blowing amount of a blowing agent;
   b. decomposing the blowing agent in the first laminate to create a cellular thermoplastic resin foam structure in the first layer;
   c. providing a random irregular surface plane of tensile discontinuity in said sandwich laminate; and
   d. delaminating the first laminate from the second laminate by stripping the laminates apart substantially along the surface plane between the bonding surface of the cellular layer of the first laminate and the thermoplastic resin surface of the second laminate, thereby providing a laminate containing a surface composed of tensile-ruptured cells of a suede-like surface appearance.

2. The method of claim 1 wherein a temperature gradient is maintained across the sandwich laminate during delamination.

3. The method of claim 1 wherein the second laminate comprises a cellular thermoplastic resin layer.

4. The method of claim 1 wherein the thermoplastic resins of the first and second laminate layers are of similar chemical composition but vary in molecular weight.

5. The method of claim 1 wherein the thermoplastic resin of the first and second laminates is a vinyl chloride resin.

6. The method of claim 1 wherein the ratio of the thickness of the first thermoplastic resin layer to the second thermoplastic resin layer varies from about 10 to 1 to 1 to 10 and wherein the temperature of delamination ranges from about 250° to 450° F.

7. A method of preparing a sheet material having a suede-like surface appearance which method comprises:
   a. bonding together the thermoplastic resin surfaces of a first and second laminate to form a sandwich laminate, each laminate comprising a sheet material having a thermoplastic resin layer bonded thereto, the layer of the first laminate comprising a vinyl chloride resin and a blowing agent;
   b. heating the sandwich laminate to a temperature sufficient to create a first cellular foam layer; and
   c. delaminating the first laminate from the second laminate by stripping the laminates apart along the surface plane between the bonding surface of the cellular layer of the first laminate and the thermoplastic resin surface of the second laminate, the temperature of stripping selected to provide a plane of tensile discontinuity between the first and second laminates, thereby providing a first and second laminate, one of which has a cellular layer of a suede-like surface appearance.

8. The method of claim 7 wherein the second laminate also comprises a vinyl chloride resin layer and a blowing agent and wherein the sandwich laminate is heated to a temperature sufficient to create a two-layer cellular structure.

9. The method of claim 8 wherein the vinyl chloride resins in the first and second laminate are compounded to provide a difference in hot strength at the temperature of stripping.

10. The method of claim 7 wherein the temperature of stripping ranges from about 250° to 450° F.

11. The method of claim 7 wherein the thickness of the layer of the first laminate ranges from about 2 to 50 mils while the thickness of the second laminate ranges from about 1 to 10 mils.

12. The method of claim 7 wherein the second laminate comprises a noncellular vinyl chloride resin layer.

13. The method of claim 12 wherein the vinyl chloride resin in the first and second laminate are compounded to provide a difference in hot strength between the surfaces of the resin layers at the temperature of stripping.

14. The method of claim 7 which includes maintaining a temperature gradient across the laminate layers during delamination.

15. The method of claim 7 wherein the temperature of delamination ranges from about 275° F to 350° F.

16. The method of claim 7 wherein the ratio of the thickness of the first and second laminates ranges from about 10:1 to 1:10.

17. The method of claim 7 wherein the sheet material of the first laminate comprises a woven fabric and the sheet material of the second laminate comprises a paper sheet.

18. The method of claim 7 wherein the first and second laminates comprises a vinyl chloride resin and the laminates are bonded together by casting vinyl chloride resin plastisol layers, one on top of the other.

19. The method of claim 7 wherein the first and second laminates comprise a vinyl chloride resin and the laminates are bonded together by heating the surfaces of calendered vinyl chloride resin sheets and pressing the heated surfaces into contact.

20. A method of preparing a sheet material having a natural suede-like surface appearance which method comprises:
   a. coating a thin coating of from about 1 to 10 mils of thickness of a vinyl chloride plastisol onto a first sheet material, said plastisol containing a small amount of a blowing agent;
   b. heating the first plastisol layer to a temperature sufficient to gel the vinyl chloride resin to a tack-free surface, but insufficient to decompose substantially the blowing agent therein;
   c. casting a coating of from about 5 to 30 mils of a second plastisol onto the surface of the gelled first plastisol layer;
   d. heating the second plastisol layer to a temperature sufficient to gel the layer and to provide a tacky upper surface to the second vinyl chloride plastisol layer;
   e. bonding to the tacky surface of the second plastisol layer a second sheet material to form a sandwich laminate;
   f. heating the sandwich laminate so formed to a temperature sufficient to provide a first cellular foam layer; and g. delaminating the sandwich laminate by stripping the first cellular layer from the second layer, the stripping occurring along the bonding plane between the bonding surface of the first and second layers, the temperature of stripping selected to provide a plane of tensile discontinuity between the respective layers thereby providing a first and second laminate, one of which has a cellular layer of a suede-like surface appearance.

21. A method of preparing a sheet material having a suede-like surface appearance, which method comprises:

providing a laminate structure having two outer sheet materials, one of which is a paper sheet and the other is a woven sheet, and at least one inner cellular foam thermoplastic resin layer;

establishing a temperature gradient providing a random irregular surface plane of tensile discontinuity in the cellular layer; and stripping the two sheet materials apart along said plane to tensile rupture the inner cellular layer, the temperature of stripping ranging from about 250° F to 450° F, thereby providing two sheet materials, each of which are characterized by an undulating suede-like surface appearance.

22. The method of claim 21 wherein the resin layers comprise plasticized vinyl chloride resin layers.

23. The method of claim 21 wherein the temperature of stripping ranges from about 275° F to 350° F.

24. The method of claim 21 which includes preparing the laminate structure by the steps of:

a. casting a first thin layer of a vinyl chloride resin plastisol onto the surface of the woven sheet material;

b. heating the first layer to a temperature to gell the resin layer;

c. casting a second thin layer of a vinyl chloride resin plastisol containing a blowing agent onto the gelled surface of the first layer;

d. placing a paper sheet material onto the surface of the second layer;

e. heating the first and second layers in an oven to fuse the resin layers and to form at least one cellular layer, thereby forming a laminate structure; and f. stripping the sheet materials apart on emergence of the laminate structure from the heating oven.

25. A method of preparing a sheet material having a suede-like surface appearance, which method comprises:

providing a laminate structure having two outer sheet materials and at least one inner cellular foam plastic resin layer, said laminate structure having a random irregular surface plane of tensile discontinuity in the cellular layer between and spaced from the two outer sheet materials of the laminate; and stripping the two sheet materials apart along said plane to tensile rupture the inner cellular layer while maintaining such tensile discontinuity to control the nature of the resulting suede surface, thereby providing two sheet materials, at least one of which is characterized by an undulating suede-like surface formed by tensile ruptured ragged-edged, irregularly-shaped open cells of said cellular layer.

26. The method of claim 25 wherein the cellular resin layer is a plasticized vinyl chloride resin layer.

27. The method of claim 25 wherein said tensile discontinuity is provided by establishing a tensile gradient between two inner layers.

28. The method of claim 25 wherein each of said two sheet materials is characterized by an undulating suede-like surface formed by tensile ruptured ragged-edged, irregularly-shaped open cells of said cellular foam layer.

29. The method of claim 25 wherein said tensile discontinuity is provided by establishing a temperature gradient in the cellular layer.

30. The method of claim 29 which includes stripping the two sheet materials apart at a temperature of from about 250° F to 450° F.

* * * * *

UNITED STATES PATENT OFFICE
CERTIFICATE OF CORRECTION

Patent No. 3,709,752          Dated January 9, 1973

Inventor(s) Reuben Wisotzky and Richard E. Petersen

It is certified that error appears in the above-identified patent and that said Letters Patent are hereby corrected as shown below:

In the title page, line [75], the name of the inventor "Reuben Wistozky" should be amended to read --Reuben Wisotzky--.

Signed and sealed this 29th day of May 1973.

(SEAL)
Attest:

EDWARD M. FLETCHER, JR.          ROBERT GOTTSCHALK
Attesting Officer                Commissioner of Patents